US007684652B2

(12) United States Patent
Zorab et al.

(10) Patent No.: US 7,684,652 B2

(45) **Date of Patent: *Mar. 23, 2010**

(54) REMOTE AUTHENTICATION SYSTEM

(75) Inventors: James Leigh Zorab, Monmouth (GB); Michael Jacobs, Abercam (GB)

(73) Assignee: The Ascent Group, Mid Glamorgan (GB)

( * ) Notice: Subject to any disclaimer, the term of this patent is extended or adjusted under 35 U.S.C. 154(b) by 0 days.

This patent is subject to a terminal disclaimer.

(21) Appl. No.: 11/866,242

(22) Filed: Oct. 2, 2007

(65) Prior Publication Data

US 2008/0156874 A1 Jul. 3, 2008

Related U.S. Application Data

(63) Continuation of application No. 10/311,186, filed as application No. PCT/GB01/02772 on Jun. 21, 2001, now Pat. No. 7,277,601.

(30) Foreign Application Priority Data

Jun. 21, 2000 (GB) ................................ 0015147.2

(51) Int. Cl.
*G06K 9/54* (2006.01)
*G06F 21/00* (2006.01)

(52) U.S. Cl. ........................................ 382/305; 705/50

(58) Field of Classification Search ................. 382/100, 382/103, 143, 180, 305, 306, 317; 340/5.8, 340/571, 572.1; 705/5, 28, 50
See application file for complete search history.

(56) References Cited

U.S. PATENT DOCUMENTS

| | | | | |
|---|---|---|---|---|
| 4,767,205 | A * | 8/1988 | Schwartz et al. | 356/71 |
| 5,289,547 | A * | 2/1994 | Ligas et al. | 283/72 |
| 5,525,969 | A | 6/1996 | LaDue | |
| 5,744,000 | A | 4/1998 | Athey et al. | |
| 6,044,353 | A | 3/2000 | Pugliese, III | |
| 6,112,502 | A * | 9/2000 | Frederick et al. | 53/411 |
| 6,222,452 | B1 | 4/2001 | Ahlstrom et al. | |
| 6,246,778 | B1 * | 6/2001 | Moore | 382/103 |
| 6,280,544 | B1 | 8/2001 | Fox et al. | |
| 6,456,729 | B1 * | 9/2002 | Moore | 382/103 |
| 6,549,891 | B1 | 4/2003 | Rauber et al. | |
| 6,591,252 | B1 | 7/2003 | Young | |
| 6,842,121 | B1 | 1/2005 | Tuttle | |

FOREIGN PATENT DOCUMENTS

| | | |
|---|---|---|
| GB | 2212310 | 7/1989 |
| GB | 2312307 | 10/1997 |
| WO | WO 84/03019 | 8/1984 |
| WO | WO 91/19614 | 12/1991 |
| WO | WO 93/22745 | 11/1993 |
| WO | WO 95/09947 | 4/1995 |
| WO | WO 99/04364 | 1/1999 |
| WO | WO 00/23954 | 4/2000 |

* cited by examiner

*Primary Examiner*—Kanji Patel
(74) *Attorney, Agent, or Firm*—Gordon & Jacobson, PC

(57) ABSTRACT

A system and method for authenticating a plurality of items each of which has a respective readable validation reference, in which information is read from the validation references, one or more items of the items is identified based on information read by the reading means, and the information is verified by comparison with stored data relating to location, origin or ownership of the one or more items.

11 Claims, 9 Drawing Sheets

REMOTE AUTHENTICATION SYSTEM

CROSS-REFERENCE TO RELATED APPLICATIONS

This is a continuation of U.S. application Ser. No. 10/311,186 filed 22 Apr. 2003, now U.S. Pat. No. 7,277,601, which is itself the U.S. national phase of PCT patent application PCT/GB01/02772 dated 21 Jun. 2001, which claims priority from GB 0015147.2, dated 21 Jun. 2000, all of which are hereby incorporated herein by reference in their entireties.

BACKGROUND OF THE INVENTION

1. Field of the Invention

This invention relates to a remote authentication system for monitoring and control of marked items.

2. State of the Art

Counterfeiting causes loss of profits to Brand Owners through loss of sales and loss of reputation. A major factor in dealing with the problem is that it is often very difficult for consumers to detect counterfeit items.

Faulty goods often need to be recalled. The problem here is that manufacturers can seldom trace where their goods are at the time they need to be recalled.

Theft in the form of shoplifting in particular is a well-recognised problem within all areas of commercial retail. It is difficult to discover whether a thief is leaving the premises with stolen property, and to distinguish between goods which have been paid for and those which have not.

Parallel Importing costs manufacturers by undercutting the prices they set for a local market. It may also render them legally liable when goods intended for country "A" do not meet the legal standards set in country "B" where the price is higher and being undercut by parallel imports.

Inventory Control requires manufacturers to know how much stock of their product remains unsold within the supply chain; it is often difficult to achieve such knowledge.

The present invention aims to alleviate problems in this field.

PCT patent application WO99/04364-A1, which describes a method of verifying the authenticity of goods, includes generating one or more random codes and storing the one or more random codes in a database. The goods are then marked with one of the generated random codes such that each of the goods contains their own unique random code. A reading and processing method is used to read the random code carried by a marked item and compare this code against those stored in the database. If the random code is found to be valid, the processing method can determine (from information held in a local database) whether or not that code has been read previously on another marked item, thereby verifying that the item is authentic (or otherwise).

There are a number of problems and disadvantages associated with the above described arrangement. Firstly if, for example, a set of random codes were either duplicated, or generated and obtained illegitimately, and applied to a batch of counterfeit goods, the codes would still be found by the processing method to be valid and, in many cases, not previously read, thereby verifying the authenticity of goods which are in fact counterfeit. This problem is exacerbated by the difficulties inherently associated with updating a local database with, for example, all non-local sales of branded goods in real time.

Further, PCT patent application WO99/04364-A1 describes a method of detecting diversion of goods from a desired channel or channels of distribution. This method involves the generation of encrypted codes (each having a random portion and a non-random portion), which are applied to a batch of goods so that each item has its own unique encrypted code. The encryption of the codes is effected by an encryption key, each encryption key being unique to a particular channel or channels. Subsequently, within a particular channel of distribution, the various goods are inspected and it is verified whether the decryption key used on the code successfully reproduces the non-random portion which is uniquely dedicated for the channel distribution in question. Consequently, the method identifies whether a diversion of goods has occurred if the decryption key does not match that used on the inspected goods.

In other words, if a channel should be using Public Key (PK) A and a product is intercepted with a PK code B mark on it, the use of the wrong PK indicates that the product has been diverted from its proper distribution channel. This makes it necessary to store a large number of PK's in the supply chain's computers.

Further, the requirement for treating different channels of distribution separately makes the scheme unnecessarily expensive to implement, and each implementation must be tailored separately. In addition, the reliance, of decryption at the retail end in particular implies the need for special readers or dedicated local computer technology, which takes the adoption of the proposed scheme relatively expensive.

The scheme described in PCT patent application WO99/04364-A1, may include a tracking or similar function which may be implemented by including in the non-random portion a secret encrypted portion containing tracking information. The codes may subsequently be decoded to determine tracking information, such as whether a tax has been paid.

There are, however, a number of disadvantages associated with this. Using the tobacco industry's requirements as an example, the government would have to create a large number of codes, keep them secure and issue them in advance of such payment—not to manufacturers (who might be in a position to exert true security but to those who have to pay duty (at the point of sale). This results in several weaknesses. Firstly, there are tens of thousands of retail outlets that would have to acquire the relevant equipment to adopt this scheme, and each of these outlets would have to be supplied with sufficient unforgeable codes to apply to the goods (they cannot be pre-applied because, until bought, no tax has been paid). Secondly, the routine sales areas must therefore adopt security measures which are likely to be extremely unrealistic. Thirdly, consider the case where France, Israel and South Africa (for example) want to adopt the scheme; this poses the problem of whose code to use to prove that the correct tax has been paid. Finally, the prior art proposal requires a huge number of different codes to be created in order to deal with different purposes.

PCT patent application WO99/04364-A1 mentions the use of one-way hash functions, but still requires the use of combination codes and PK's. In WO99/04364-A1, a "hash" message is reconstructed by using a readable field until a match is found. However, this is quite time consuming and laborious. In a preferred aspect of the present invention, there is included a database in which is stored the original codes alongside their "hash" values. This "field" can be indexed so that the matching of "hash" values is substantially instantaneous (less than one second in over a billion records), just as it would be if one were searching for the original code.

SUMMARY OF THE INVENTION

In accordance with a first aspect of the present invention, there is provided an authentication and/or tracking system for identifying, tracking, authenticating and/or otherwise checking the legitimacy of one or more items which include a coded identity tag or mark (or validation reference, as will be described hereinafter), the system comprising identification means for reading said coded identity tag or mark and identifying the one or more items, storage means for storing information relating to the location, whether actual or intended, origin, and/or ownership of the one or more items, and means for displaying or otherwise providing or verifying the information.

The first aspect of the present invention also extends to a method of identifying, tracking, authenticating and/or otherwise checking the legitimacy of one or more items which include a coded identity tag or mark (validation reference), comprising the steps of reading the identity tag or mark and identifying the one or more items, storing information relating to the location, whether actual or intended, origin and/or ownership of the one or more items, and displaying or otherwise providing or verifying the information relating to an item when its identity tag or mark has been read.

This coded identity tag or mark can amongst others be in the form of a simple printed validation reference (VR) which could be represented by a bar code, bar coded tear-tape or security thread, radio frequency tag or ink (visual, fluorescent or magnetic), optical device such as a hologram or digitally printed device, organic chemical (such as a DNA tag) or inorganic chemical or complex printed image.

Products which manufacturers need to protect from the above problems are provided with a unique identifier which is securely stored and subsequently traceable using a publicly accessible central authentication database. This unique reference is referred to within the system as a Validation Reference, hereafter abbreviated VR.

The VR can be physically attached to the product in any way that is deemed suitable by the manufacturer. The VR must be verifiably unique within the product type for the manufacturer.

All the VRs created by a manufacturer must be stored on a centrally and publicly accessible database. This database must store basic despatch details in addition to the VR. It must also record the inquiries or authentication attempts made against each VR.

Various agencies and consumers will need to access this database. They will typically enter, into a computer based form, the VR attached to the product and the system will inform them whether or not the VR has a match in the central database. A match indicates that the product is probably authentic, unless the VR has already been registered elsewhere. In addition, the time and place of authentication are also considered. If a valid VR is in the wrong place or in the right place but at the wrong time, this indicates the probability of counterfeit.

It is essential that, until the marked goods are actively selling from retail sites, VRs are not accessible to potential counterfeiters.

In the preferred embodiment of the system, the requirement to ensure that VRs are kept out of the hands of counterfeiters is met by a novel method of storing the valuable data. Instead of storing plaintext, the VR is converted to a "message digest" using a "one-way "hash" function", subsequently referred to as a "hash". That digest is stored in place of the VR. Such digests are provably irreversible. The only method of decoding one is to generate sufficient random strings to ensure that a match is found. For the "hash" function used in the preferred embodiment, this means that if 10,000 hashes were to come into the possession of a counterfeiter, he would need to create approximately 1.3×1027 strings to find a single match amongst the 10,000. This is currently computationally infeasible in that by today's standards each such search would require some third of a million years processing time of the world's fastest computers.

As VRs in this form are substantially of no value to the counterfeiter, the security problem of guarding the data on the central database is considerably reduced.

For many products that require protection, the database will provide the first step in tackling a case of counterfeit goods. It will identify that a problem exists. It will then be necessary to prove, to the satisfaction of a court, that the product either is (and purports not to be) the genuine article or is counterfeit (but purports to be genuine). This may frequently require a forensic test. For products that do not include unique forensic markers a coded fiber such as described in detail in European Patent No. 0721529 may be used.

Having been thus marked and having stored the information relating to that mark, it becomes possible to tackle the problems outlined above. In summary, one of the key differences between the present invention and the arrangement described in WO99/04364-A1 is that that prior art arrangement envisages "tracking" to be a passive function achieved by means of selective code generation whereby the code indicates the prospective destination. In the present invention, the use of active tracking is much more flexible and universally applicable. Only one code is required wherever the goods are destined to arrive. The transit details are preferably stored separately in association with that code. Field checking and preferably consumer registration is used to determine where goods are, and the database is used to determine whether or not that is where they should be.

If no VR exists either on a product that should display the code or a VR appears on a product but not within the authentication database then the product cannot be legitimate.

If a VR exists but has already been registered as in the hands of a consumer, or other legitimate holder then either the registered product or the one being checked can reasonably be assumed to be counterfeit. Forensic testing might then be required to establish which one is genuine. This is an example of where the coded fiber might be usefully deployed.

If a VR exists but is reported in the wrong place or at the wrong time then it can reasonably be assumed to be counterfeit.

If a product carrying a VR is tracked going through the door of a retail outlet and it has not been paid for, it can reasonably be assumed that it is being stolen.

To be effective, the VR must contain a unique element that is verifiably not associated with any other similar item produced by the relevant manufacturer.

This is a simple matter for appropriate software. It does not matter if two unrelated items share a VR. The combination of their make, model and VR will still produce a universally unique identifier Preferably, the method used to attach the VR should be compatible with (that is, readable by) the machine readers likely to be already in situ throughout the supply chain. This alleviates the huge expense of supplying a new infrastructure to service the system. Provided this criterion is met, any method of labelling or attaching the VR which suits the manufacturer will be compatible with the system. Hereafter, all such means are referred to generically as “labels”.

For consumer registration purposes it is currently essential that the VR is readable by the consumer. This means it must appear visually in plaintext. Future developments may allow other options.

For asset tracking, anti-theft and some anti-counterfeiting purposes (where, for example, a forensic marker is desirable), the mark may need to be covert and/or structurally incorporated into the item.

If an item requires more than one of the above protections, it may well also require more than one tag. It may also use different data in each tag. For example, a pair of jeans may have a human readable label beneath a standard barcode for machine readability in order to facilitate the tracking and registration objectives. These may share the same code. Manufacturers may, in addition, however, incorporate the aforementioned coded fibers into the fabric of the jeans at the weaving stage. The codes used for this purpose could be unrelated to the previous codes and may, for example, only be readable under a microscope in a forensic laboratory engaged to verify authenticity.

In accordance with a second aspect of the invention, there is provided a data management system for passing or identifying data between a first node and a second node, the first and second nodes independently having access (direct or otherwise) to a copy of the data, the first node having means for converting the data into a substantially irreversibly encrypted code representative of the data and passing only the code (that is, not the data) to the second node, the second node having means for identifying the data represented by the code.

The second aspect of the present invention also extends to a method of data management for securely passing or identifying data between a first node and a second node, the method comprising the steps of providing independent access (direct or otherwise) to the data to each of the first and second nodes, converting at the first node the data into a substantially irreversible encrypted code representative of the data, passing only the code (that is, not the data) from the first node to the second node, and identifying at the second node the data represented by the code.

Thus, the second aspect of the present invention provides a method and system whereby the functional requirements of key data can be entirely fulfilled by coded replacements for the data, specifically by means of converting the key data into codes or digests using one-way encryption techniques, such as one-way hash functions or any other (possibly future) algorithms which achieve substantially the same end (that is, the creation of substantially irreversibly encrypted codes or digests representative of the key data, allowing for more secure handling of the data. It will be apparent that no decryption of the code is required at the second node (because it has independent access to the data in its own right), simply recognition thereof.

Preferred unique identifiers will be designed to make it impossible for potential fraudsters to abuse the system. For example, by creating a key consisting of 20 random characters representing any one of 256 ASCII (like) symbols, this makes possible a code with 20256 possible combinations—well beyond the ability of existing computer processing capacity to crack. Because such codes would include unprintable characters, they would, currently, be suitable for machine readability only.

For product registration, where the code needs to be retrieved visually, a code based on 20 of the 36 upper case unambiguous keyboard characters found on most European and American keyboards allows 3620 combinations. This is still considered to be considerably beyond present day computing capacity.

To prevent errors on input, the preferred embodiment would incorporate a 25-character string incorporating one check character for each four random characters. This would be presented in 5 blocks of 5 characters—similar to popular modern software license keys.

To allow remote interrogation of the database, so called “thin client” software will be distributed to allow consumers to enter the VRs with minimal errors. Their input will be converted to its corresponding “hash” values before being passed to the central database for matching.

Thin client software will also be distributed to agencies such as Customs, Police (public and private) and key points in the supply chain. This version of the software will permit machine input and interrogation of data other than just VRs.

Preferably, the VRs will be generated by the manufacturers only shortly before the labels are required. The labels will be printed, attached and scanned as the goods are packed into cartons. The Carton identifiers will be stored. Cartons will be scanned as they are loaded onto pallets (or similar) and pallets will be scanned as they are loaded into consignments (etc). Relevant identifiers will be stored for however many packing stages are required.

When the consignment is ready to leave, the manufacturer will use appropriate software to prepare a file containing one record per VR. Each such record will also contain the above identifiers. It will also, preferably contain the relevant order numbers, dispatch date, source and destination. The file will be transmitted securely to the central database.

Agents in the field who need to access the database can thus be informed, for example, which cartons should be in a consignment and which VRs should be in which cartons. Or whether a given VR should be in the consignment at all. Agents will be provided with suitable means of secure access.

Authorised users in the supply chain could also use the system to confirm either that the products they are holding are legitimate or to monitor the progress of expected deliveries. They will also be provided with the means to:

(1) update the system database with information regarding any deliveries;

(2) inform the system of their own consignments; and (3) when a delivery consignment is broken down into two or more despatch consignments, to provide the system with relevant details of the split (that is, the contents of the new consignments) and the new consignment identities.

In order to protect the integrity of the database, in its preferred form, in addition to normal storage on high speed storage and retrieval media, it will be simultaneously stored on unreadable media known in the art as WORM (Write Once Read Many) media. Both the WORM media and standard media will be duplicated across a number of predetermined locations.

Its access and update protocols will be designed to permit such access only by means of an Access log which records all details of requests for access and/or any data uploaded to the system and stores this data on WORM media before permitting the data to be recorded on standard media. No deletions will be permitted and amendments will only be permitted in the form of corrective additions. The WORM media will thus provide a robust audit trail should anyone attempt to subvert the system. The contents of the Access log will be on permanent public view with standard non-disclosure rules to protect the identities of those accessing the system.

The present invention provides a method and system that can be used to track products or items and can be used not only to verify the validity of a code or to check whether the code has been used before, but also to check whether the code is being used at the right time and/or in the right place. Failure to meet any of these criteria identifies a potential counterfeit. As a spin off, monitoring to this degree provides the ability to identify parallel trading (where the goods in transit might well be legitimate and even legally transported, but still in breach of contract or trading agreements), and to pinpoint wherever the goods are located in the supply chain, for the purposes of inventory control and product recall.

Subject to technology allowing remote reading of the VRs, the system also provides the basis for a powerful anti-theft mechanism.

Key preferred elements, among others, of the present invention are:

- storage of authentication data in a centrally accessible database;
- storage of "hash" values (only) in place of the valuable components of that data;
- indexing of the "hash" values to make the data easy to search;
- logging all access to the database in a publicly visible manner;
- storing the access log on non amendable media;
- storing the access log and data in multiple locations;
- allowing additions or amendments to the data only through the access log; and
- allowing detailed interrogation of the data only through the access log.

The system will be able to achieve its goals because it is able to answer the fundamental question ("does this identity, exist?") without the need to know what the identity is.

BRIEF DESCRIPTION OF THE DRAWINGS

An embodiment of the invention will now be described by way of example only with reference to the accompanying drawings, in which.

DETAILED DESCRIPTION OF THE PREFERRED EMBODIMENTS

Figure 1:
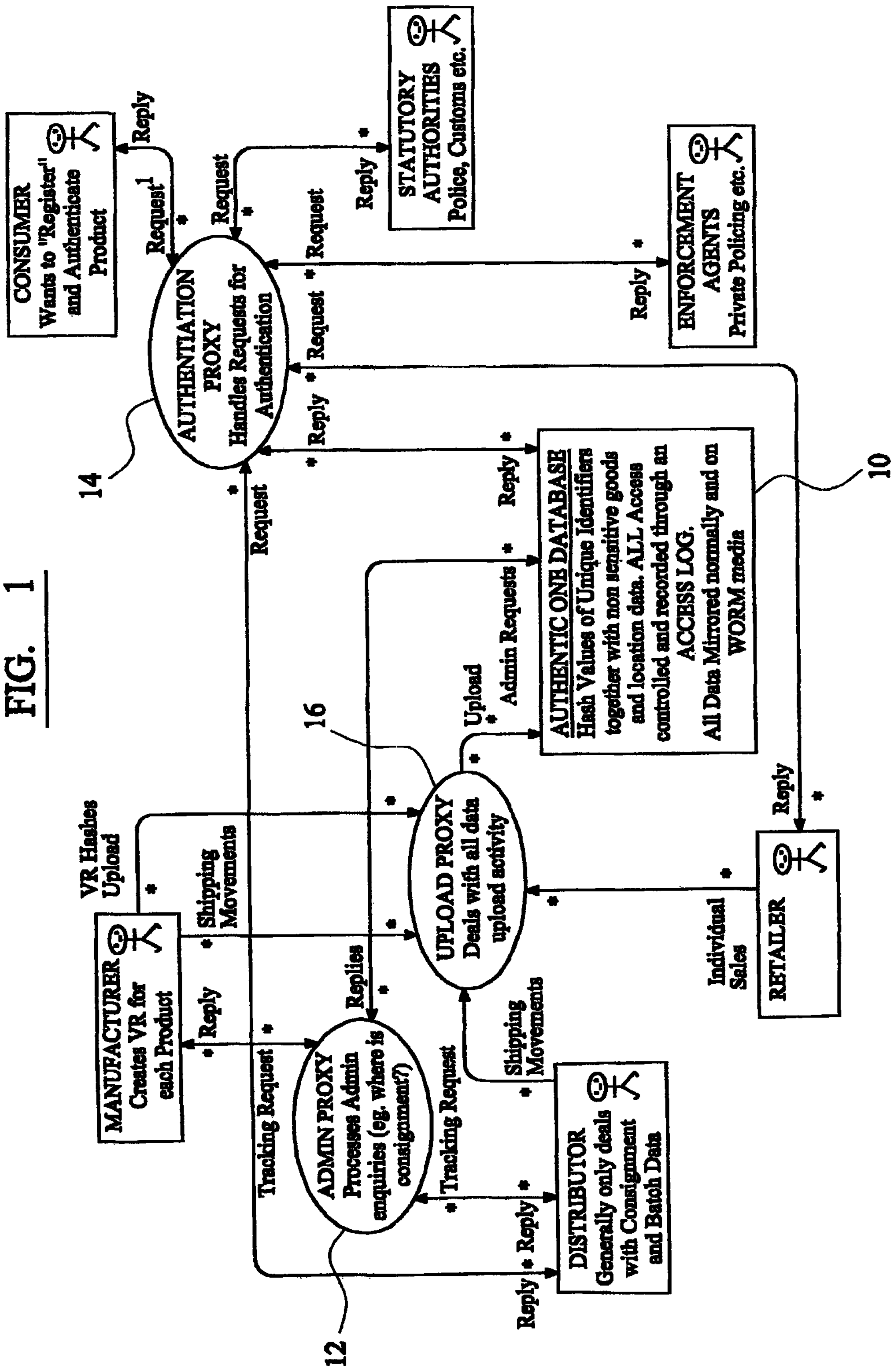
FIG. 1 is a schematic flow diagram illustrating the operation of a product tracking system which makes use of and is an exemplary embodiment of the authentication aspect of the invention.

Referring now in particular to FIG. 1 of the drawings, an exemplary embodiment of a product tracking system according to the invention comprises a central database (10) on which are stored the "hash" values of the identity tags together with product tracking data. The system includes means (12) for processing administrative enquiries, such as the current location of a consignment of products. The system also includes means (14) for processing authentication enquiries, and means (16) for dealing with all data upload activity. These are standardised proxy procedures with which persons skilled in the art would be familiar.

Figure 2:
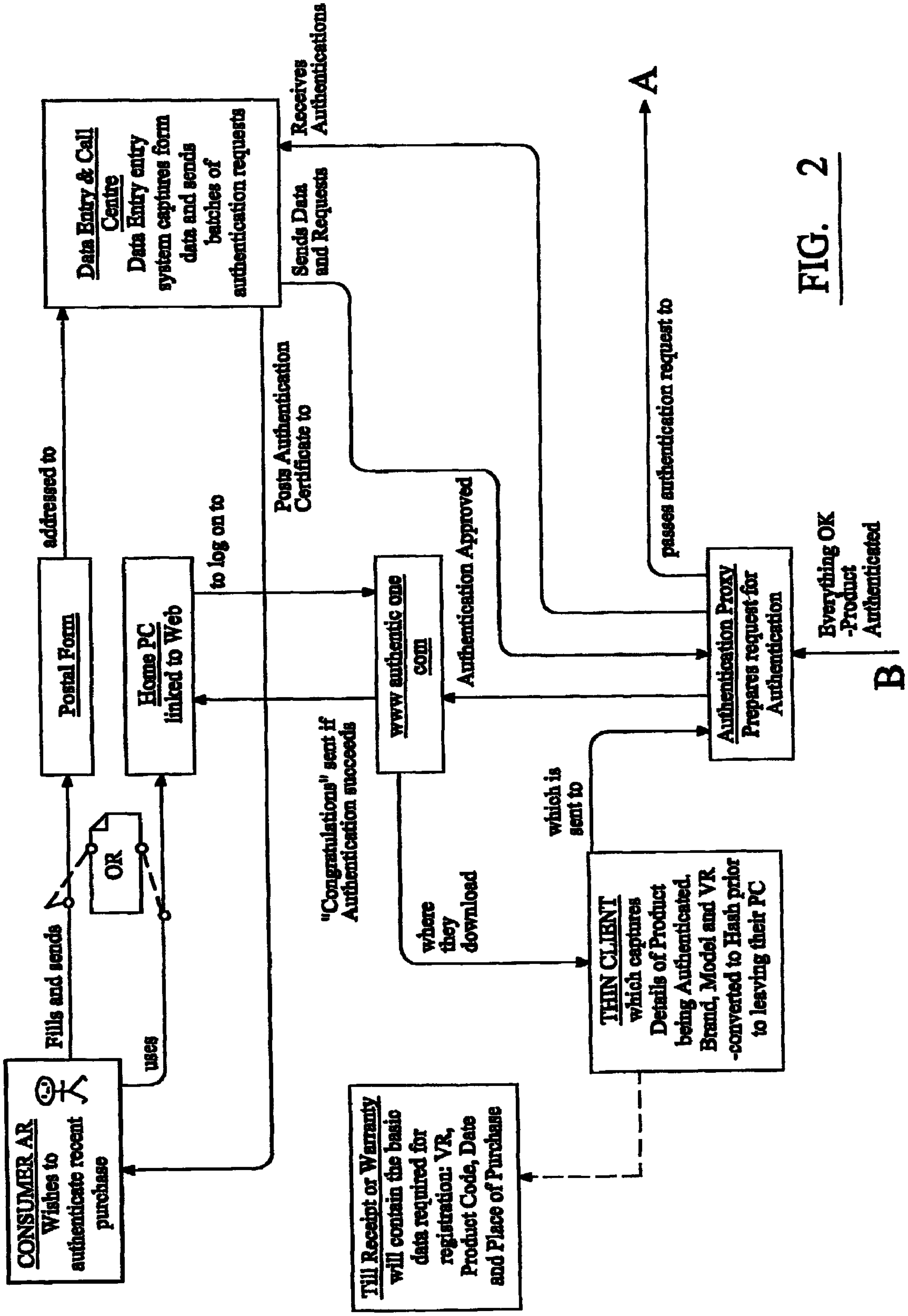
FIG. 2 is a schematic flow diagram of the consumer authentication operation of the system of FIG. 1.
Figure 2:
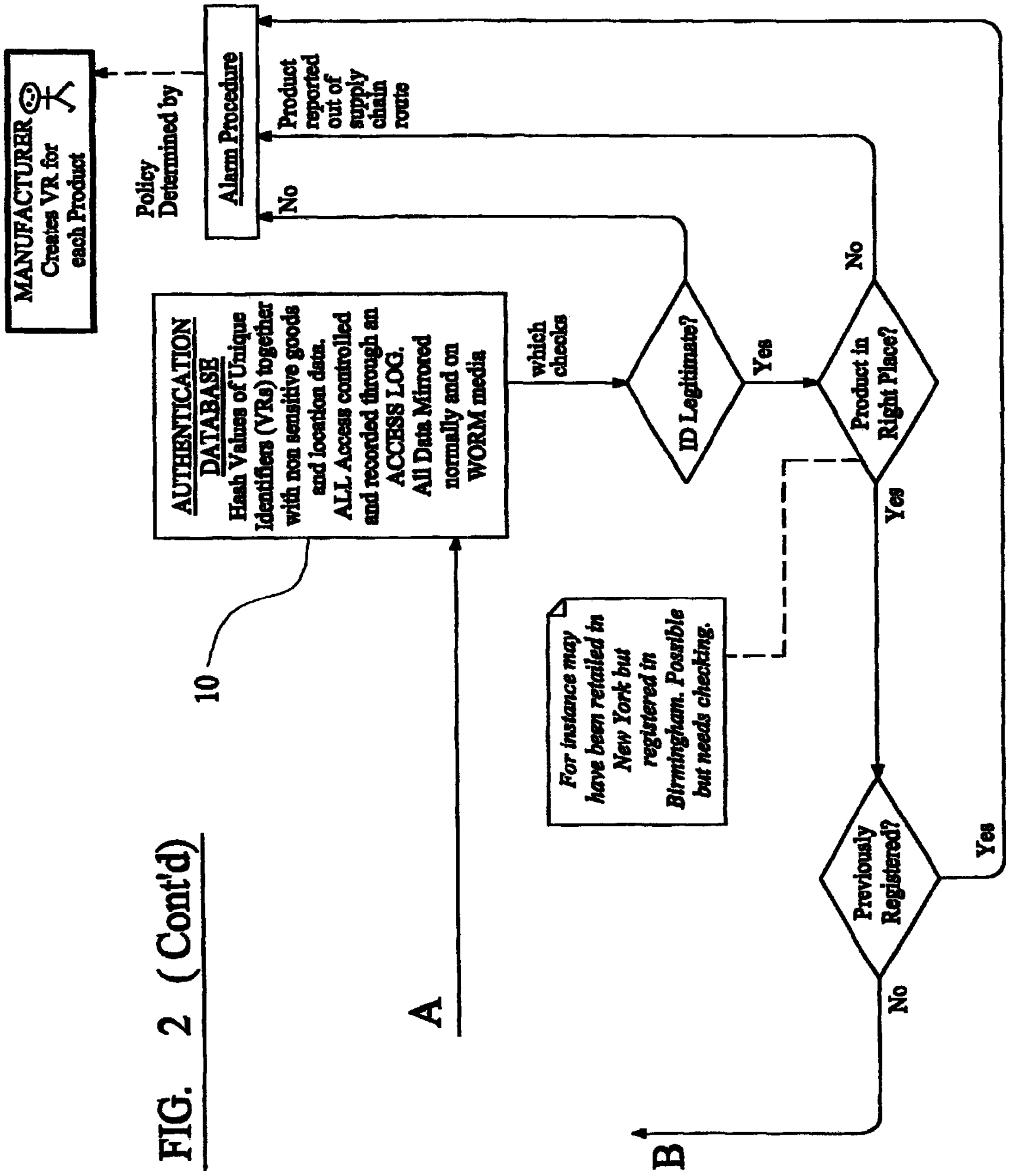

The authentication process is shown in more detail in FIG. 2. The consumer can send an authentication request to the system in many different ways, as discussed above. In one such method, in response to a request from the user, an onscreen form is provided for the consumer to complete details such as the identity tag, product code if relevant, date and place of purchase. The system uses the form to prepare an authentication request and, if necessary, converts key data to a "hash" value. The data is then compared with data held in the database (10) which checks if the identity tag is legitimate, if the product is in the correct location, and whether or not the product has been previously registered. If these enquiries produce the correct results, the product is authenticated and the consumer can be informed accordingly. If not, a suitable alarm/report procedure, which may be determined by the manufacturer, for example, is triggered.

Figure 3:
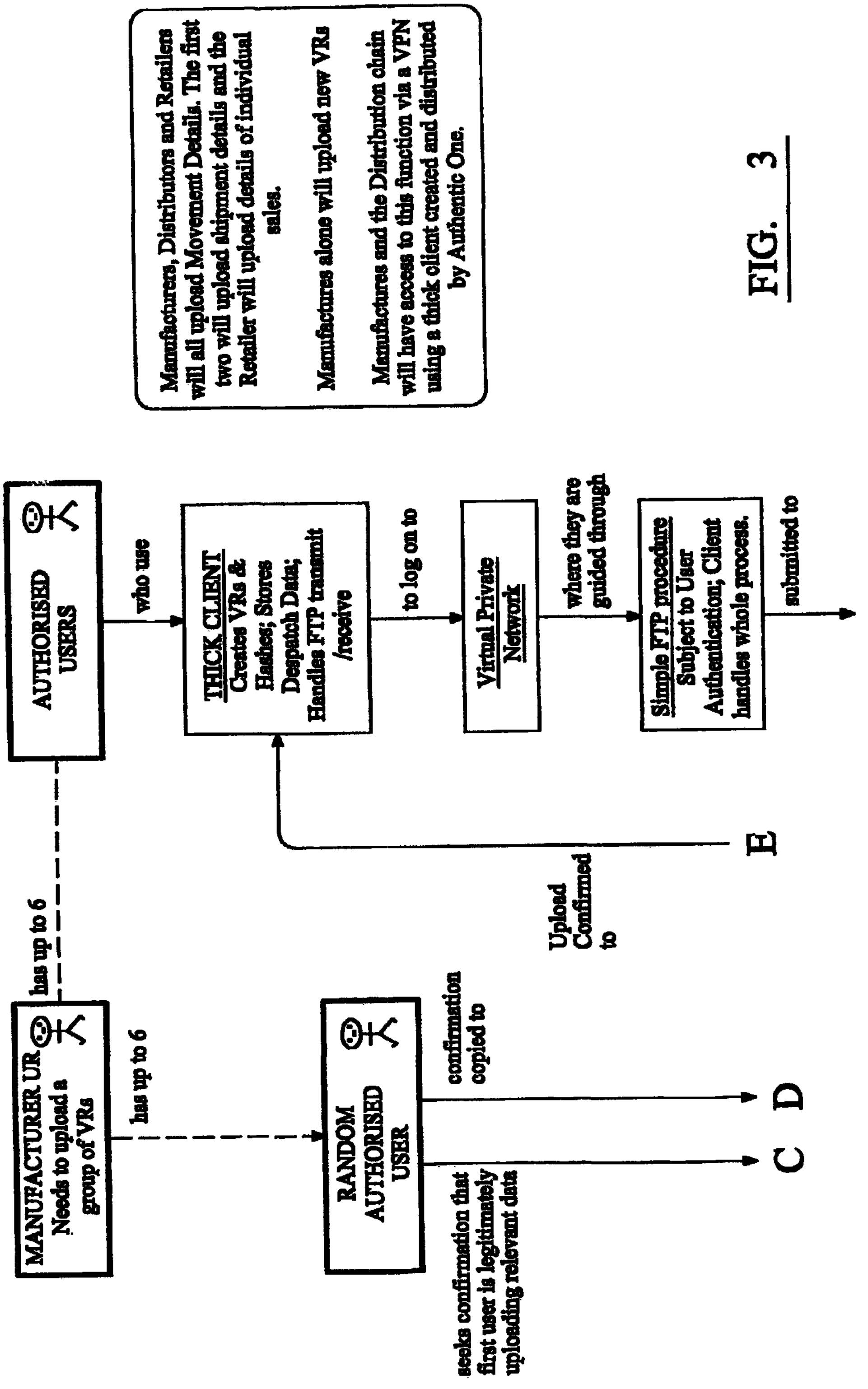
FIG. 3 is a schematic flow diagram of the upload activity (by manufacturers) of the system of FIG. 1.
Figure 3:
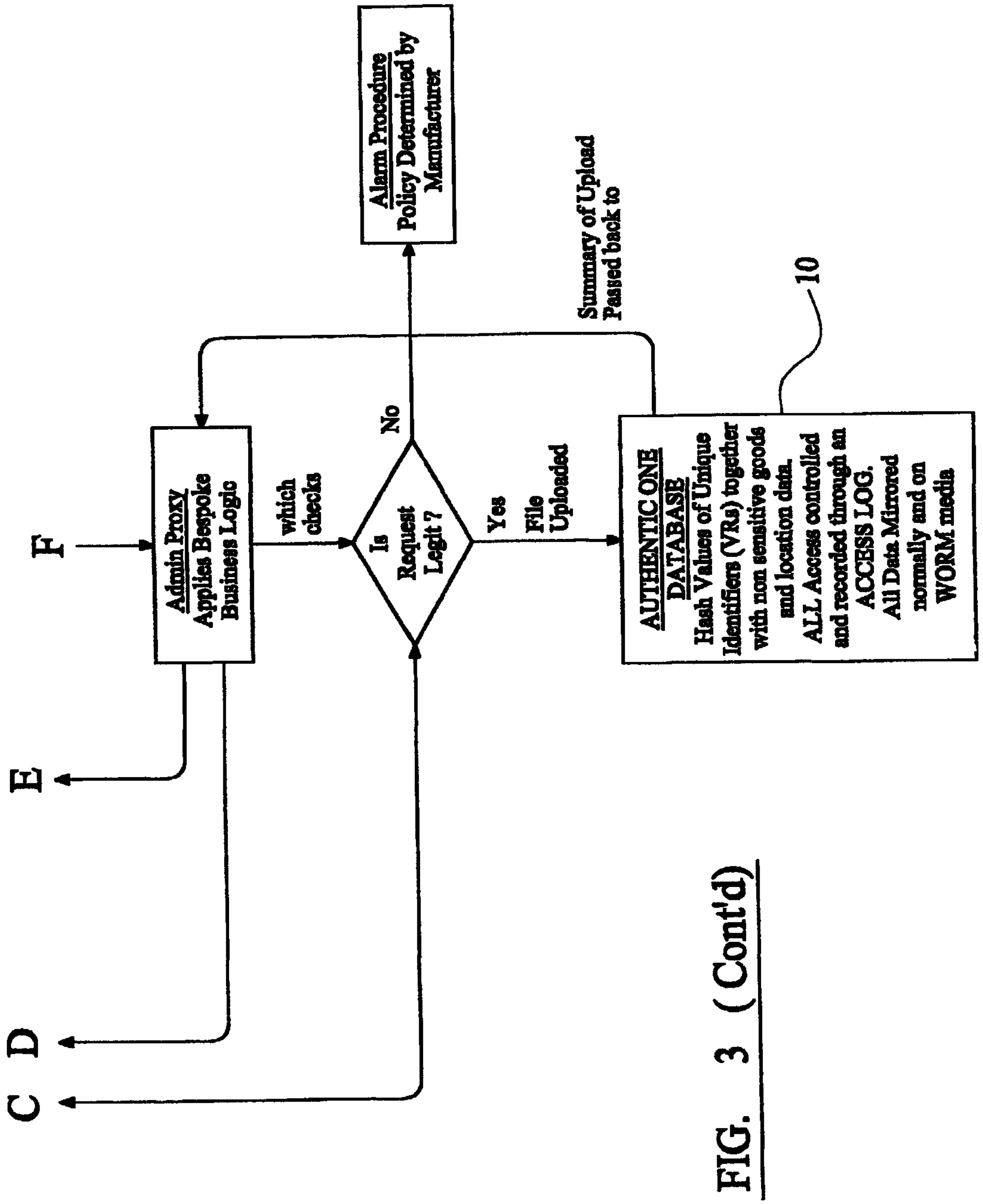

The upload activity of the system is shown in more detail in FIG. 3 of. The drawings. A manufacturer has completed a production batch and it is ready for shipping. They need to upload the relevant data to the Authentication Database.

All the data has been prepared by appropriate software. Each individual item will have been given its VR and the hashes of those VRs, together with, at least, the minimal data outlined above, will be transmitted by the software to the Authentication Database. Procedures will need to be in place to ensure that only authorised users can be allowed to perform this task, but other then validate themselves to the system, the users will have little to do other than authorise the transfer. Everything else would be automated.

However, the uploading of data from a legitimate source is a particularly sensitive transaction. In the preferred embodiment of the system, therefore, it would be prudent to ensure that no upload can proceed until at least one other, preferably randomly selected, authorised user has been contacted and has confirmed the legitimacy of the upload.

Figure 4:
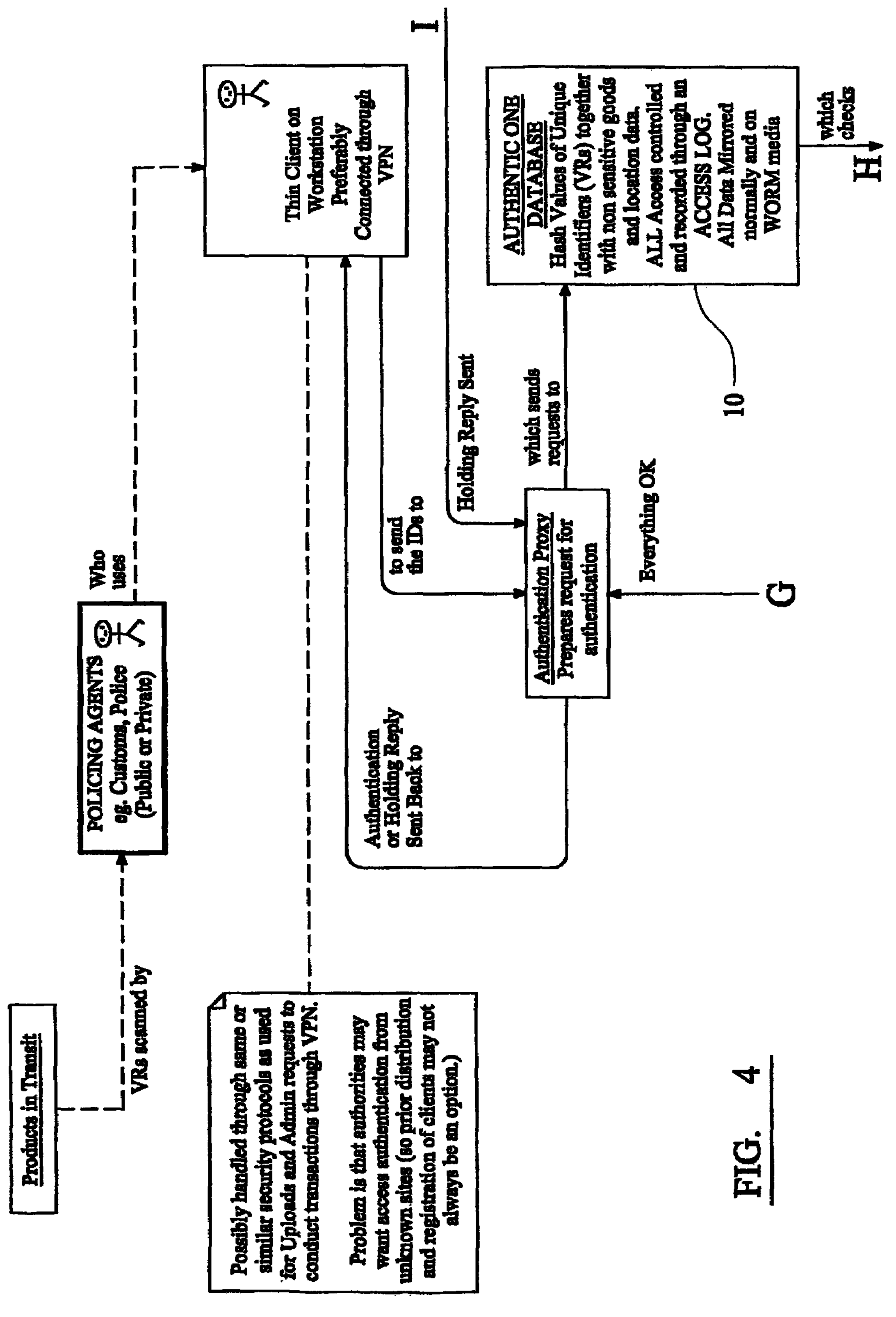
FIG. 4 is a schematic flow diagram of the non-consumer (Police, Customs etc) authentication operation of the system of FIG. 1.
Figure 4:
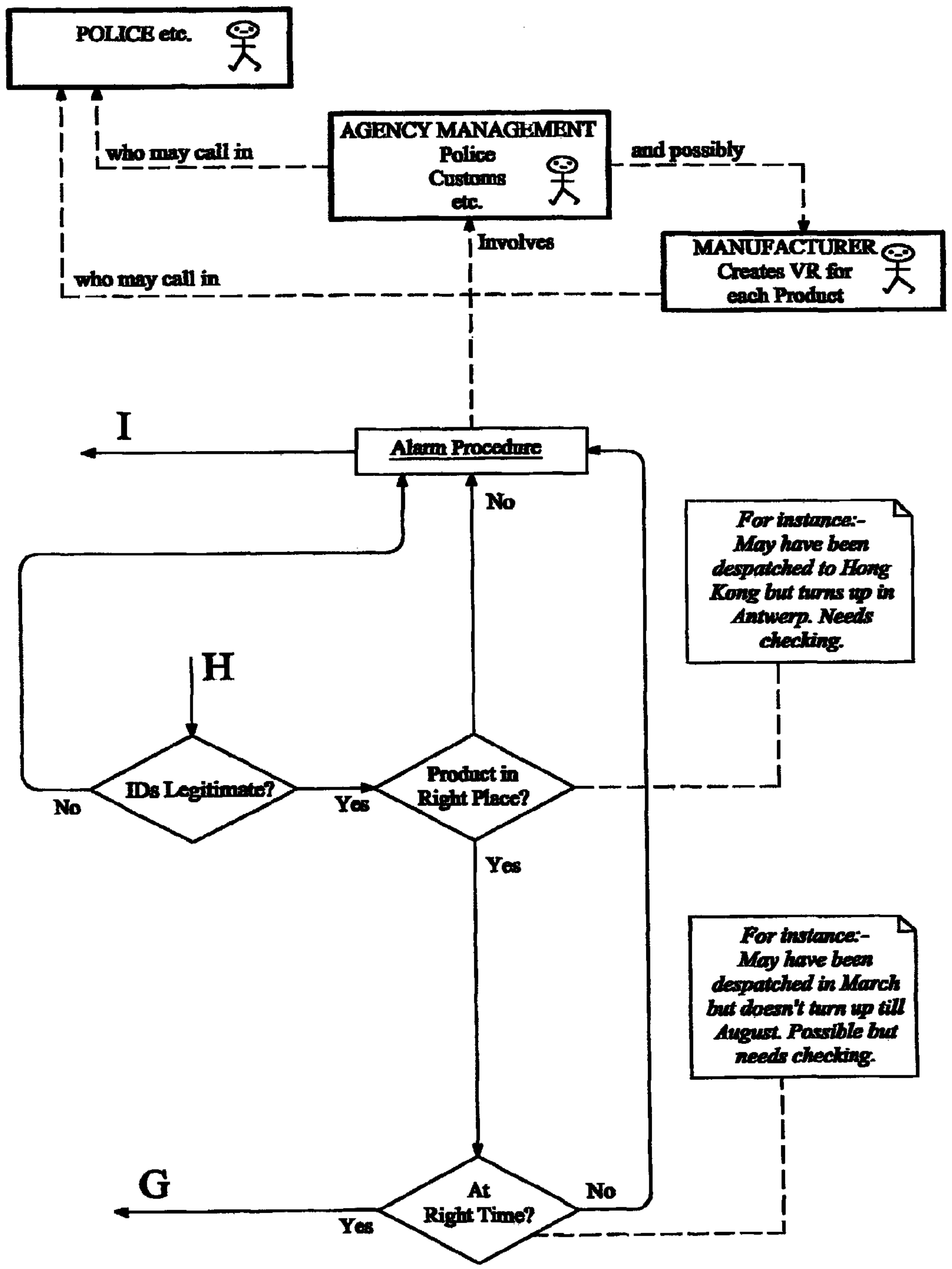
Figure 5:
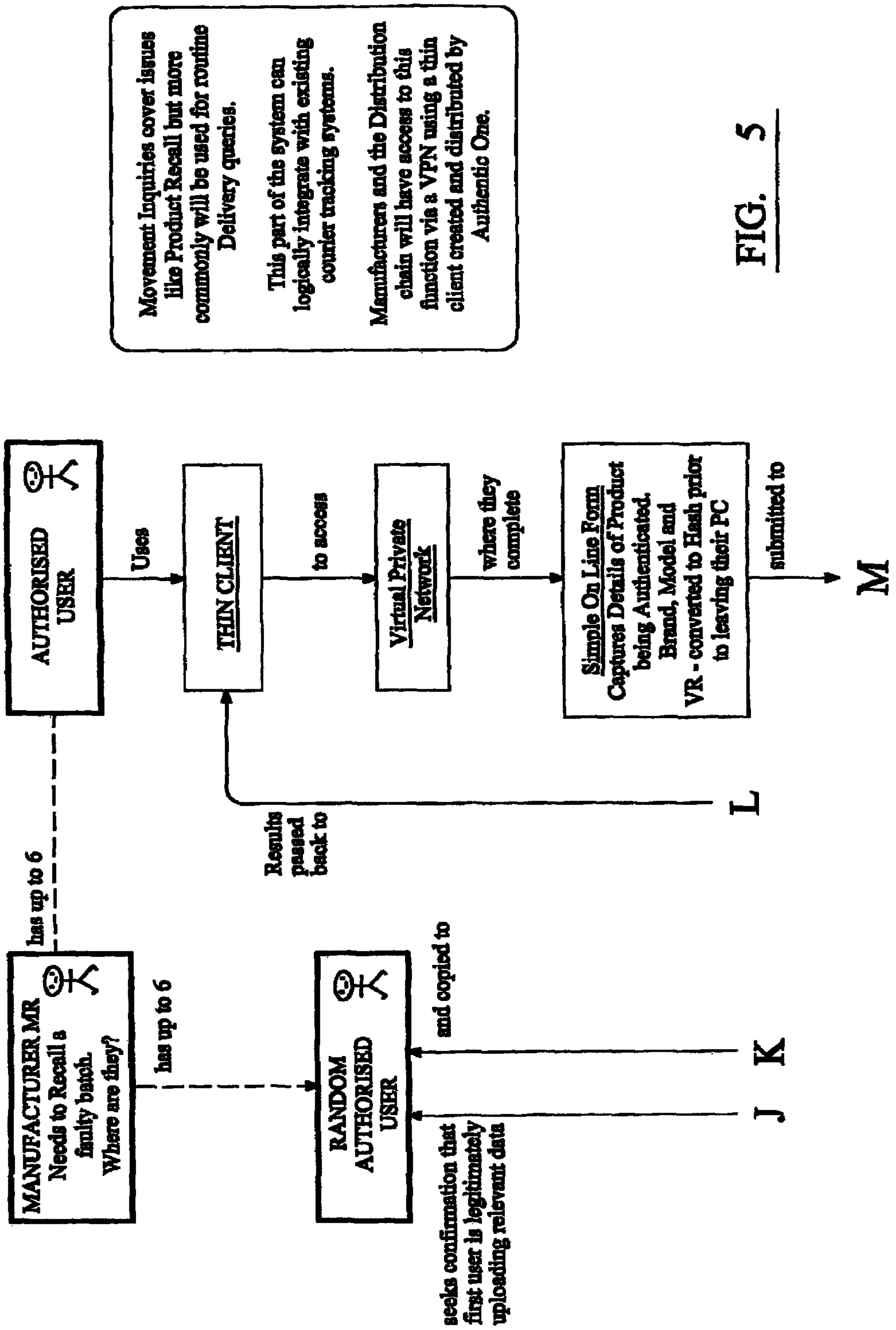
FIG. 5 is a schematic flow diagram of a movement inquiry operation of the system of FIG. 1.
Figure 5:
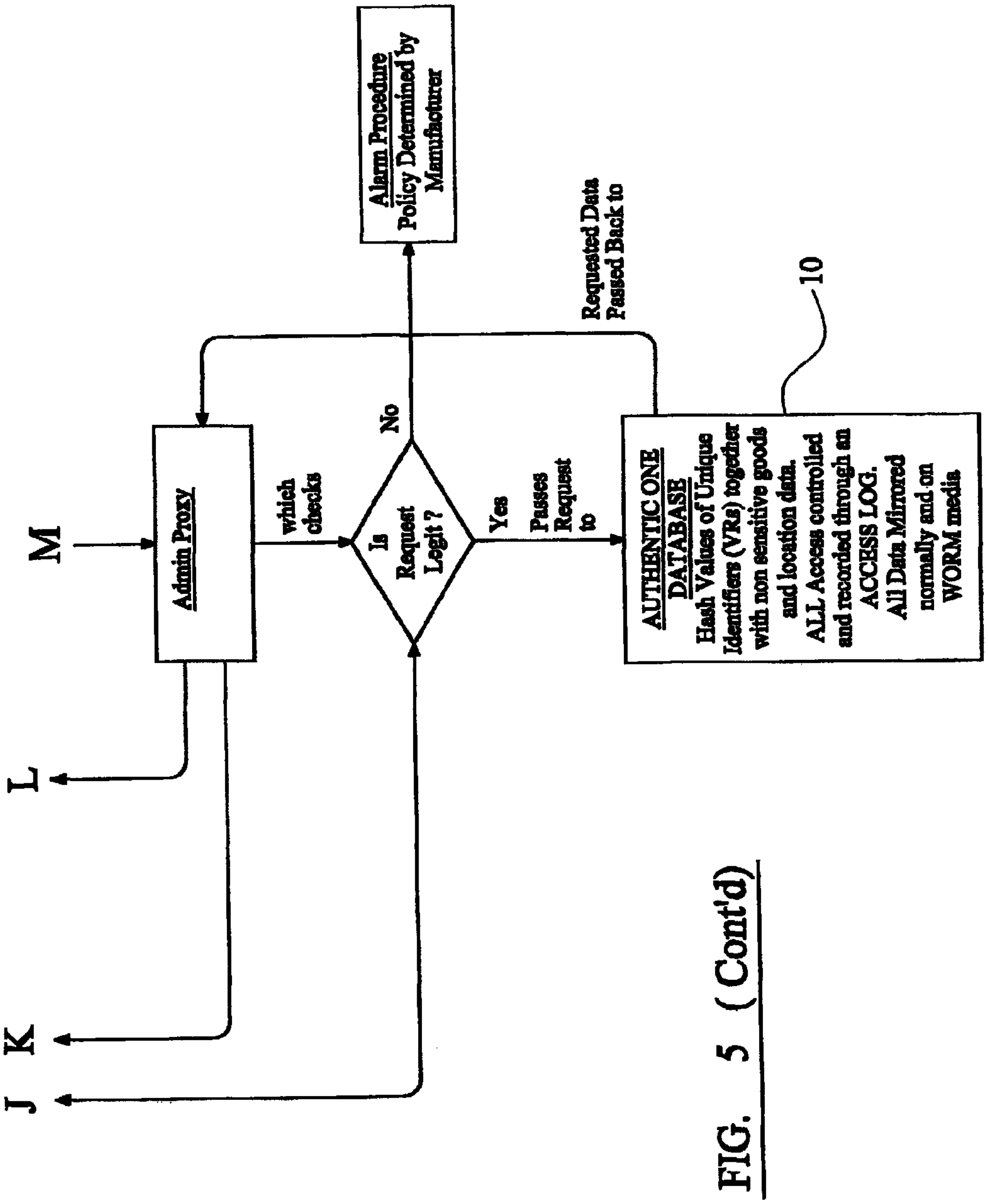

The non-consumer authentication process operates in a very similar manner to the consumer authentication process and is shown in more detail in FIG. 4 of the drawings. Similarly, the data upload activity used is very similar to that described with reference to FIG. 3 of the drawings, and is shown in more detail in FIG. 5.

Embodiments of the invention have been described herein by way of example only, and modifications and variations will be apparent to a person skilled in the art, without departing from the scope of the invention.

What is claimed is:

1. A method of authenticating a plurality of items comprising:

- providing a product tracking system including a database;
- applying substantially identical validation references to each of a plurality of items in a batch of items to be transported from a first location to a second location;
- storing first information in the database of the product tracking system, the first information relating to the departure of said batch of items from said first location and the arrival of said batch of items at said second location;
- dividing said batch of items into a plurality of smaller consignments of one or more items to be transported or distributed from said second location to one or more third locations; and
- storing second information in the database of the product tracking system, the second information relating to the departure of said consignments from said second location and their arrival at said one or more third locations.

2. A method according to claim 1, further comprising:

storing third information in the database of the product tracking system, the third information relating to the contents of a batch of items having different validation references applied thereto, the departure of said batch from a first location, the arrival thereof at a second location, and a subsequent destination for each of said items in said batch.

3. A method according to claim 1, further comprising:

i) converting information relating to a plurality of said validation references into individual codes using a predefined algorithm;

ii) storing said codes in a first predetermined location;

iii) converting information relating to a validation reference which has been read into a code using said predefined algorithm; and iv) comparing said code against said stored codes to determine whether each said validation reference is legitimate.

4. A method according to claim 3, wherein:

said codes comprise "hash" values having 20 or more characters.

5. A method according to claim 3, wherein: said information is stored on unerasable media in a plurality of further predetermined locations.

6. A method according to claim 1, further comprising:

storing purchase information in the database of the product tracking system, the purchase information relating to said items;

identifying the validation references of items leaving a predetermined location; and determining if said items have been purchased or are otherwise legitimately permitted to leave said area and, if not, raising an alarm.

7. A method of authenticating a plurality of items comprising:

providing a product tracking system including a database;

applying substantially identical validation references to each of a plurality of items in a batch of items to be transported from a first location to a second location;

storing first information in the database of the product tracking system, the first information relating to the departure of said batch of items from said first location and the arrival of said batch of items at said second location;

converting information relating to a plurality of said validation references into individual codes using a predefined algorithm;

comparing said codes against data stored in the database of the product tracking system to determine whether each said validation reference is legitimate;

dividing said batch of items into a plurality of smaller consignments of one or more items to be transported or distributed from said second location to one or more third locations; and storing second information in the database of the product tracking system, the second information relating to the departure of said consignments from said second location and their arrival at said one or more third locations.

8. A method according to claim 7, further comprising:

storing third information in the database of the product tracking system, the third information relating to the contents of a batch of items having different validation references applied thereto, the departure of said batch from a first location, the arrival thereof at a second location, and a subsequent destination for each of said items in said batch.

9. A method according to claim 7, wherein:

said codes comprise "hash" values having 20 or more characters.

10. A method according to claim 7, wherein: said information is stored on unerasable media in a plurality of further predetermined locations.

11. A method according to claim 7, further comprising: storing purchase information in the database of the product tracking system, the purchase information relating to said items;

identifying the validation references of items leaving a predetermined location; and determining if said items have been purchased or are otherwise legitimately permitted to leave said area and, if not, raising an alarm.

* * * * *